July 11, 1933.   J. M. YOUNG   1,917,284
SHEET METAL CONTAINER
Filed May 22, 1929
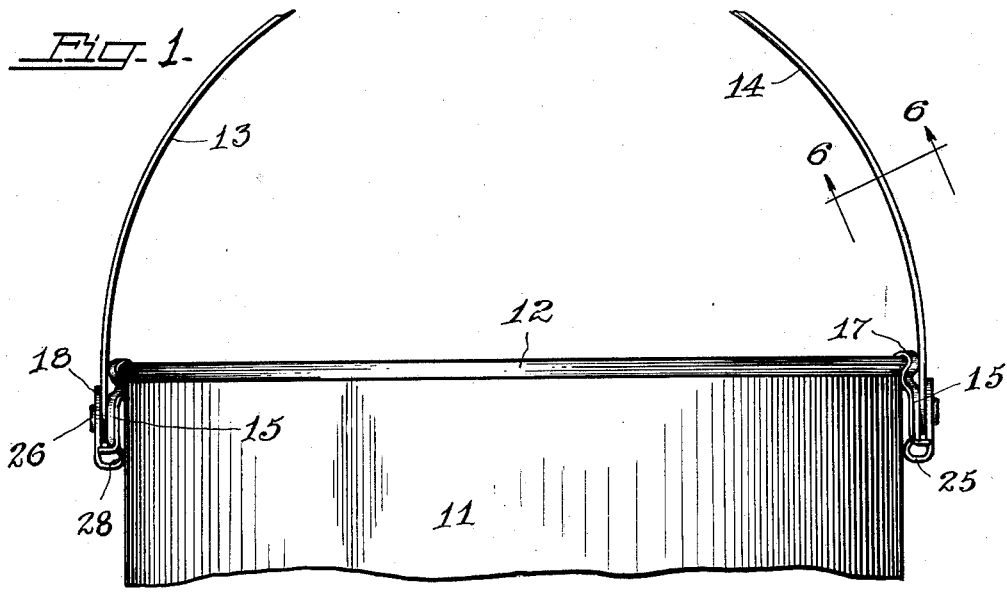
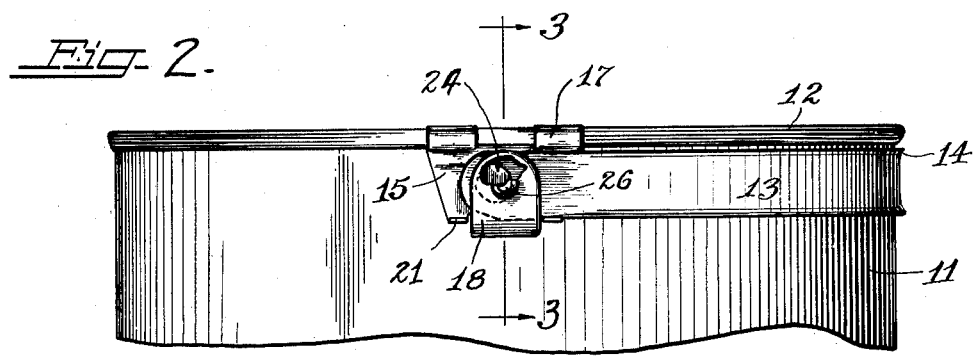
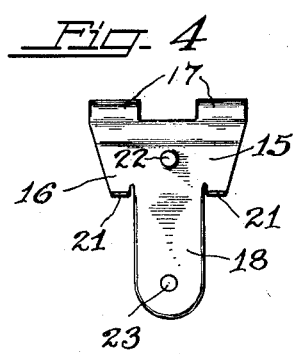 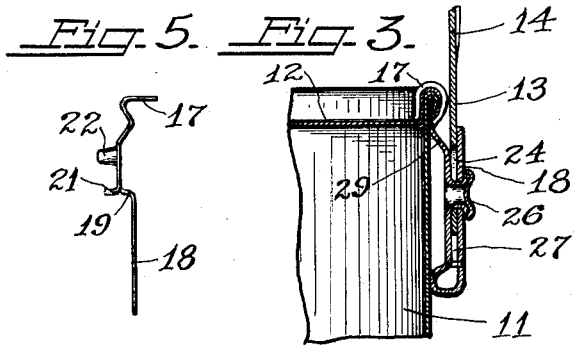
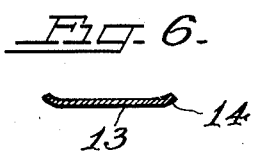
INVENTOR
John M. Young
BY John C. Carpenter
ATTORNEY Patented July 11, 1933

1,917,284

UNITED STATES PATENT OFFICE

JOHN M. YOUNG, OF BROOKLYN, NEW YORK, ASSIGNOR TO AMERICAN CAN COMPANY, OF NEW YORK, N. Y., A CORPORATION OF NEW JERSEY

SHEET METAL CONTAINER

Application filed May 22, 1929. Serial No. 364,960.

The present invention relates to a new and useful improvement in sheet metal containers and has more particular reference to a container having a bail or handle pivotally connected therewith.

The principal object of the present invention is the provision of a metallic container having a bail formed of a flat strip of sheet material and having pivotal connection with an improved type of bail ear or clip which is attached directly to the container.

A further important object of the present invention is the provision of a container bail formed from a flat strip of sheet material and having pivotal and sliding connection with an improved type of bail ear or clip clamped at opposite points to the wall of a container whereby the bail may be used in a vertical position as a handle or may be moved to a horizontal position and pressed into close position adjacent the container wall.

An important object of the invention is the improvement of an improved bail ear or clip formed from a single piece of sheet metal and embodying an integral rivet section to form a pivot for a bail, part of the ear structure being looped to provide spaced walls enclosing a pocket in which the end of the bail is freely movable.

A further important object of the invention is the provision of a unique bail ear or clip which provides the connecting element between the bail and the container and which is self-contained for attachment to the container, for pivotal connection with the bail, and for guiding and aligning the bail during its pivotal and sliding movement relative to the container.

Numerous other objects and advantages of the invention will be apparent as it is better understood from the following description, which, taken in connection with the accompanying drawing, discloses a preferred embodiment thereof.

Referring to the drawing:—

Figure 1 is a front elevation, parts being broken away, of a container, its bail and bail ears being made according to the present invention, the bail being shown in container carrying position.

Fig. 2 is a side elevation of the container parts, the bail being shown in non-carrying position, closely adjacent the wall of the container, parts being broken away.

Fig. 3 is an enlarged fragmentary sectional view taken substantially along line 3—3 in Fig. 2, the bail being moved to container carrying position.

Fig. 4 is a front elevation of a bail ear in the process of formation.

Fig. 5 is an edge view of the bail ear shown in Fig. 4.

Fig. 6 is a transverse sectional view of the bail taken substantially along line 6—6 in Fig. 1.

The improved container of the present invention comprises a body 11 which may be closed with a top or end 12 double seamed or otherwise secured thereto. A bail or handle 13 is provided for carrying the container and comprises a flat semi-circular body portion having its side edges slightly bent transversely at 14 (Figs. 2 and 6) thus, presenting a smooth surface for the hand of the user.

A pair of clips or bail ears 15 are provided to form the connecting element between bail 13 and body 11. These clips 15 are preferably stamped from flat metal stock and are formed in such a manner as to provide three striking advantages in bail ears. One such advantage relates to attachment of the bail directly to the container without the use of rivets, solder or other extra parts. The bail ear also provides a self-contained pivotal and sliding connection for the bail without the use of rivets or other separate parts. Such a bail ear, also, provides a keeper for the bail ends guiding and aligning the bail relative to the container during its movement between container carrying and container non-carrying positions.

Bail clips 15 are manufactured in a series of stamping and forming operations and in one stage of development (Figs. 4 and 5) comprises a body 16, spaced attaching lugs 17 bent substantially at right angles to the body 16, a tail extension 18, offset at 19 from the body 16, and spaced locking lugs 21 projected from the body 16.

A restricted portion of the body is extruded at 22 and a hole 23 is provided in the tail extension 18 near its extremity. The bail clip 15 in the form illustrated in Figs. 4 and 5 is then ready for attachment with the bail 13.

Each end of bail 13 is provided with an opening 24 (Figs. 2 and 3) and the extruded portion 22 of the clip 15 is positioned within the opening 24 as the bail is positioned on the clip. The inner wall of the end of bail 13 in such position lies against the body 16 of the clip. While held in this assembled position the tail extension 18 is bent upwardly adjacent the offset 19 and hole 23 therein is placed over the extruded portion 22, the extension 18 moving between the locking lugs 21. During this bending action a loop 25 is formed in the bail clip.

The outer extremity of the extruded part 22 is thereupon depressed or upset to form a rivet 26 which constitutes the pivot for the bail 13. This upsetting of the part 22 and the forming of the rivet 26 locks the tail 18 into parallel relationship with the body 16 of the clip, the end of bail 13 being thus loosely confined within a pocket 27 formed between the parallel walls 16 and 18. The clip 15 is in this way converted into a bail ear.

After each end of the bail 13 has been connected to its formed bail ear, these ears are then secured to the container. This is preferably done by bending attaching lugs 17 over seam 12 thus clamping them securely in place on diametrically opposite positions of the container. Greater rigidity is given to this connection between bail ear and container body (Figs. 1 and 3) by an inner wall 28 of the loop 25 resting against the wall of the body 11 when the bail ear is in its clamped position. The carrying weight of the container is applied on the bail ears practically parallel to the container wall and a projecting shoulder 29 of the bail ear body 16 abutting against the seam 12 takes up this thrust insuring further great rigidity.

Opening 24 in each end of the bail 13 is made sufficiently large to permit sliding movement of the bail ends in the respective pockets 27 of their bail ears. This sliding movement is utilized in the moving of bail 13 into non-carrying position. At such time, the bail is first pivoted about its rivets 26 to bring it into substantially horizontal position after which it is slid horizontally to closely engage the outer wall of the body 11, the enlarged openings 24 permitting this sliding action. In this condition the container may be rolled through a standard form of labeling machine and a label applied thereto without interference of the bail 14.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A sheet metal container including a cylindrical body, a pair of bail ears secured to the body, each ear being formed from a strip of sheet material and being bent back on itself to provide a pocket, a rivet formed integrally from a struck-out portion of the wall of each strip and extending transversely of said pocket, and a flat semi-circular sheet metal bail, each of its ends having movement within said pocket and having pivotal engagement on said rivet.

2. A sheet metal container including a cylindrical body, a top secured thereto in a projecting seam, a pair of bail ears clamped over said seam and positioned at diametrically opposite points near the top of said container body, said ears having extensions bent back and spaced from the body of the ear to form pockets, these extensions being held in position by a struck-out integral rivet, and a flat semi-circular sheet metal bail having movement with said loops, each end of said bail having an enlarged opening in which said rivet is positioned, said bail thereby having pivotal and sliding connection with the container body.

3. A bail ear for a sheet metal container comprising a body, attaching lugs for securing said ear to the seam of a container, a tail extension bent into a loop and having a wall spaced from said body to form a pocket, and an integral rivet struck out from the said body and extending across said pocket to provide a pivotal connection for a container carrying bail.

JOHN M. YOUNG.